(12) United States Patent
Kerr et al.

(10) Patent No.: US 7,260,518 B2
(45) Date of Patent: *Aug. 21, 2007

(54) NETWORK FLOW SWITCHING AND FLOW DATA REPORT

(75) Inventors: Darren R. Kerr, Union City, CA (US); Barry L Bruins, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 10/924,710

(22) Filed: Aug. 23, 2004

(65) Prior Publication Data

US 2005/0027506 A1 Feb. 3, 2005

Related U.S. Application Data

(63) Continuation of application No. 08/886,900, filed on Jul. 2, 1997, now Pat. No. 6,889,181, which is a continuation of application No. 08/655,429, filed on May 28, 1996, now Pat. No. 6,243,667, and a continuation of application No. 08/771,438, filed on Dec. 20, 1996, now Pat. No. 6,308,148.

(51) Int. Cl.
*G06F 3/01* (2006.01)
*H04L 12/56* (2006.01)

(52) U.S. Cl. .................. 703/27; 703/20; 370/379; 370/382; 370/389

(58) Field of Classification Search ............ 703/20, 703/27; 370/379, 382, 389
See application file for complete search history.

(56) References Cited

U.S. PATENT DOCUMENTS 4,064,360 A 12/1977 Koenig
4,131,767 A 12/1978 Weinstein
4,161,719 A 7/1979 Parikh et al.

(Continued)

FOREIGN PATENT DOCUMENTS

EP 0 384 758 A2 8/1990

(Continued)

OTHER PUBLICATIONS

Cormen et al., "Introduction to Algorithms", MIT Press, seventeenth edition, pp. 221-224.

(Continued)

*Primary Examiner*—Thai Phan
(74) *Attorney, Agent, or Firm*—Hickman Palermo Truong & Becker LLP (57) ABSTRACT

The invention provides a method and system for switching in networks responsive to message flow patterns. A message "flow" is defined to comprise a set of packets to be transmitted between a particular source and a particular destination. When routers in a network identify a new message flow, they determine the proper processing for packets in that message flow and cache that information for that message flow. Thereafter, when routers in a network identify a packet which is part of that message flow, they process that packet according to the proper processing for packets in that message flow. The proper processing may include a determination of a destination port for routing those packets and a determination of whether access control permits routing those packets to their indicated destination.

24 Claims, 5 Drawing Sheets

U.S. PATENT DOCUMENTS

| | | |
|---|---|---|
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,491,945 A | 1/1985 | Turner |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,713,806 A | 12/1987 | Oberlander et al. |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,788,657 A | 11/1988 | Douglas et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,304 A | 1/1990 | Giacopelli et al. |
| 4,893,306 A | 1/1990 | Chao et al. |
| 4,903,261 A | 2/1990 | Baran et al. |
| 4,905,233 A | 2/1990 | Cain et al. |
| 4,922,486 A | 5/1990 | Lidinsky et al. |
| 4,933,937 A | 6/1990 | Konishi |
| 4,933,938 A | 6/1990 | Sheehy |
| 4,960,310 A | 10/1990 | Cushing |
| 4,962,497 A | 10/1990 | Ferenc et al. |
| 4,962,532 A | 10/1990 | Kasirai et al. |
| 4,965,757 A | 10/1990 | Grassart |
| 4,965,767 A | 10/1990 | Kinoshita et al. |
| 4,965,772 A | 10/1990 | Daniel et al. |
| 4,970,678 A | 11/1990 | Sladowski et al. |
| 4,979,118 A | 12/1990 | Kheradpir |
| 4,980,897 A | 12/1990 | Decker et al. |
| 4,991,169 A | 2/1991 | Davis et al. |
| 5,003,595 A | 3/1991 | Collins et al. |
| 5,006,982 A | 4/1991 | Ebersole et al. |
| 5,014,265 A | 5/1991 | Hahne et al. |
| 5,014,327 A | 5/1991 | Potter et al. |
| 5,020,058 A | 5/1991 | Holden et al. |
| 5,033,076 A | 7/1991 | Jones et al. |
| 5,034,919 A | 7/1991 | Sasai et al. |
| 5,051,987 A | 9/1991 | Conlon |
| 5,054,034 A | 10/1991 | Hughes-Hartogs |
| 5,059,925 A | 10/1991 | Weisbloom |
| 5,063,612 A | 11/1991 | McKeown |
| 5,072,449 A | 12/1991 | Enns et al. |
| 5,088,032 A | 2/1992 | Bosack |
| 5,095,480 A | 3/1992 | Fenner |
| 5,101,402 A | 3/1992 | Chiu et al. |
| RE33,900 E | 4/1992 | Howson |
| 5,115,431 A | 5/1992 | Williams et al. |
| 5,115,495 A | 5/1992 | Tsuchiya et al. |
| 5,128,926 A | 7/1992 | Perlman et al. |
| 5,128,945 A | 7/1992 | Enns et al. |
| 5,136,580 A | 8/1992 | Videlock et al. |
| 5,166,930 A | 11/1992 | Braff et al. |
| 5,189,662 A | 2/1993 | Kleine-Altekamp |
| 5,199,049 A | 3/1993 | Wilson |
| 5,206,638 A | 4/1993 | McKeown |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,231,633 A | 7/1993 | Hluchyj et al. |
| 5,233,604 A | 8/1993 | Ahmadi et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,245,614 A | 9/1993 | Gutman et al. |
| 5,247,516 A | 9/1993 | Bernstein et al. |
| 5,249,178 A | 9/1993 | Kurano et al. |
| 5,249,292 A | 9/1993 | Chiappa |
| 5,251,205 A | 10/1993 | Callon |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,267,235 A | 11/1993 | Thacker |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,287,535 A | 2/1994 | Sakagawa et al. |
| 5,291,442 A | 3/1994 | Emma et al. |
| 5,291,482 A | 3/1994 | McHarg et al. |
| 5,301,333 A | 4/1994 | Lee |
| 5,305,311 A | 4/1994 | Lyles |
| 5,307,343 A | 4/1994 | Bostica et al. |
| 5,309,437 A | 5/1994 | Perlman et al. |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,325,358 A | 6/1994 | Goeldner |
| 5,325,504 A | 6/1994 | Tipley et al. |
| 5,327,421 A | 7/1994 | Hiller et al. |
| 5,331,637 A | 7/1994 | Francis et al. |
| 5,335,224 A | 8/1994 | Cole |
| 5,339,311 A | 8/1994 | Turner |
| 5,345,445 A | 9/1994 | Hiller et al. |
| 5,345,446 A | 9/1994 | Hiller et al. |
| 5,347,642 A | 9/1994 | Barratt |
| 5,353,283 A | 10/1994 | Tsuchiya |
| 5,357,506 A | 10/1994 | Sugawara |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,377,181 A | 12/1994 | Rogers |

| Patent | Date | Inventor |
|---|---|---|
| 5,381,413 A | 1/1995 | Tobagi et al. |
| 5,386,413 A | 1/1995 | McAuley et al. |
| 5,386,567 A | 1/1995 | Lien et al. |
| 5,390,170 A | 2/1995 | Sawant et al. |
| 5,390,175 A | 2/1995 | Hiller et al. |
| 5,392,280 A | 2/1995 | Zheng |
| 5,394,394 A | 2/1995 | Crowther et al. |
| 5,394,402 A | 2/1995 | Ross |
| 5,394,408 A | 2/1995 | Nishihara et al. |
| 5,396,491 A | 3/1995 | Newman |
| 5,400,325 A | 3/1995 | Chatwani et al. |
| 5,408,469 A | 4/1995 | Opher et al. |
| 5,416,842 A | 5/1995 | Aziz |
| 5,418,922 A | 5/1995 | Liu |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,426,637 A | 6/1995 | Derby et al. |
| 5,428,607 A | 6/1995 | Hiller et al. |
| 5,430,715 A | 7/1995 | Corbalis et al. |
| 5,430,729 A | 7/1995 | Rahnema |
| 5,432,784 A | 7/1995 | Ozveren |
| 5,434,863 A | 7/1995 | Onishi et al. |
| 5,436,886 A | 7/1995 | McGill |
| 5,440,550 A | 8/1995 | Follett |
| 5,442,457 A | 8/1995 | Najafi |
| 5,442,624 A | 8/1995 | Bonomi et al. |
| 5,442,630 A | 8/1995 | Gagliardi et al. |
| 5,444,491 A | 8/1995 | Lim |
| 5,448,559 A | 9/1995 | Hayter et al. |
| 5,450,406 A | 9/1995 | Esaki et al. |
| 5,452,294 A | 9/1995 | Natarajan |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,693 A | 2/1996 | Britton et al. |
| 5,491,804 A | 2/1996 | Heath et al. |
| 5,497,368 A | 3/1996 | Reijnierse et al. |
| 5,497,371 A | 3/1996 | Ellis et al. |
| 5,499,238 A | 3/1996 | Shon |
| 5,500,858 A | 3/1996 | McKeown |
| 5,504,747 A | 4/1996 | Sweasey |
| 5,509,006 A | 4/1996 | Wilford et al. |
| 5,509,123 A | 4/1996 | Dobbins et al. |
| 5,515,376 A | 5/1996 | Murthy et al. |
| 5,517,494 A | 5/1996 | Green |
| 5,517,620 A | 5/1996 | Hashimoto et al. |
| 5,519,704 A | 5/1996 | Farinacci et al. |
| 5,519,858 A | 5/1996 | Walton et al. |
| 5,523,999 A | 6/1996 | Takano et al. |
| 5,524,254 A | 6/1996 | Morgan et al. |
| 5,526,489 A | 6/1996 | Nilakantan et al. |
| 5,528,592 A | 6/1996 | Schibler et al. |
| 5,530,963 A | 6/1996 | Moore et al. |
| 5,533,033 A | 7/1996 | Ratner |
| 5,535,195 A | 7/1996 | Lee |
| 5,539,734 A | 7/1996 | Burwell et al. |
| 5,539,737 A | 7/1996 | Lo et al. |
| 5,541,911 A | 7/1996 | Nilakantan et al. |
| 5,546,370 A | 8/1996 | Ishikawa |
| 5,548,593 A | 8/1996 | Peschi |
| 5,550,816 A | 8/1996 | Hardwick et al. |
| 5,555,244 A | 9/1996 | Gupta et al. |
| 5,557,747 A | 9/1996 | Rogers et al. |
| 5,559,801 A | 9/1996 | Lo |
| 5,561,669 A | 10/1996 | Lenney et al. |
| 5,566,170 A | 10/1996 | Bakke et al. |
| 5,572,522 A | 11/1996 | Calamvokis et al. |
| 5,577,035 A | 11/1996 | Hayter et al. |
| 5,583,862 A | 12/1996 | Callon |
| 5,583,865 A | 12/1996 | Esaki et al. |
| 5,586,121 A | 12/1996 | Moura et al. |
| 5,592,470 A | 1/1997 | Rudrapatna et al. |
| 5,598,115 A | 1/1997 | Holst |
| 5,598,532 A | 1/1997 | Liron |
| 5,598,581 A | 1/1997 | Daines et al. |
| 5,600,798 A | 2/1997 | Cherukuri et al. |
| 5,602,770 A | 2/1997 | Ohira |
| 5,604,868 A | 2/1997 | Komine et al. |
| 5,608,726 A | 3/1997 | Virgile |
| 5,608,908 A | 3/1997 | Barghouti et al. |
| 5,610,904 A | 3/1997 | Eng et al. |
| 5,613,096 A | 3/1997 | Danknick |
| 5,614,891 A | 3/1997 | Zeinstra et al. |
| 5,617,417 A | 4/1997 | Sathe et al. |
| 5,617,421 A | 4/1997 | Chin et al. |
| 5,621,720 A | 4/1997 | Bronte et al. |
| 5,625,622 A | 4/1997 | Johri |
| 5,630,125 A | 5/1997 | Zellweger |
| 5,631,908 A | 5/1997 | Saxe |
| 5,632,021 A | 5/1997 | Jennings et al. |
| 5,633,869 A | 5/1997 | Burnett et al. |
| 5,634,010 A | 5/1997 | Ciscon et al. |
| 5,634,011 A | 5/1997 | Auerbach et al. |
| 5,638,359 A | 6/1997 | Peltola et al. |
| 5,644,713 A | 7/1997 | Makishima |
| 5,644,718 A | 7/1997 | Belove et al. |
| 5,644,751 A | 7/1997 | Burnett |
| 5,651,002 A | 7/1997 | Van Seters et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,675,579 A | 10/1997 | Watson et al. |
| 5,678,006 A | 10/1997 | Valizadeh et al. |
| 5,680,116 A | 10/1997 | Hashimoto et al. |
| 5,684,797 A | 11/1997 | Aznar et al. |
| 5,684,800 A | 11/1997 | Dobbins et al. |
| 5,684,954 A | 11/1997 | Kaiserswerth |
| 5,687,324 A | 11/1997 | Green et al. |
| 5,689,506 A | 11/1997 | Chiussi et al. |
| 5,691,984 A | 11/1997 | Gardner et al. |
| 5,694,390 A | 12/1997 | Yamato et al. |
| 5,699,532 A | 12/1997 | Barrett |
| 5,724,351 A | 3/1998 | Chao et al. |
| 5,740,097 A | 4/1998 | Satoh |
| 5,740,157 A | 4/1998 | Demiray |
| 5,742,760 A | 4/1998 | Picazo, Jr. et al. |
| 5,742,905 A | 4/1998 | Pepe et al. |
| 5,748,186 A | 5/1998 | Raman |
| 5,748,617 A | 5/1998 | McLain, Jr. |
| 5,754,547 A | 5/1998 | Nakazawa |
| 5,754,768 A | 5/1998 | Brech et al. |
| 5,771,231 A | 6/1998 | Watanabe |
| 5,774,660 A | 6/1998 | Brendel et al. |
| 5,774,698 A | 6/1998 | Olnowhich |
| 5,781,772 A | 7/1998 | Wilkinson, III |
| 5,793,745 A | 8/1998 | Manchester |
| 5,793,978 A | 8/1998 | Fowler |
| 5,796,736 A | 8/1998 | Suzuki |
| 5,802,054 A | 9/1998 | Bellenger |
| 5,809,415 A | 9/1998 | Rossman |
| 5,835,696 A | 11/1998 | Hess |
| 5,835,710 A | 11/1998 | Nagami et al. |
| 5,841,874 A | 11/1998 | Kempke et al. |
| 5,842,040 A | 11/1998 | Hughes et al. |
| 5,842,224 A | 11/1998 | Fenner |
| 5,854,903 A | 12/1998 | Morrison et al. |
| 5,856,981 A | 1/1999 | Voelker |
| 5,859,837 A | 1/1999 | Crayford |
| 5,862,136 A | 1/1999 | Irwin |

| | | |
|---|---|---|
| 5,872,783 A | 2/1999 | Chin et al. |
| 5,892,924 A | 4/1999 | Lyon et al. |
| 5,898,686 A | 4/1999 | Virgile |
| 5,903,559 A | 5/1999 | Acharya et al. |
| 5,905,723 A | 5/1999 | Varghese et al. |
| 5,909,440 A | 6/1999 | Ferguson |
| 5,914,953 A | 6/1999 | Krause et al. |
| 5,917,820 A | 6/1999 | Rekhter |
| 5,917,821 A | 6/1999 | Gobuyan et al. |
| 5,920,566 A | 7/1999 | Hendel et al. |
| 5,925,097 A | 7/1999 | Gopinath et al. |
| 5,970,232 A | 10/1999 | Passint et al. |
| 5,991,817 A | 11/1999 | Rowett et al. |
| 5,996,021 A | 11/1999 | Civanlar |
| 6,006,264 A | 12/1999 | Colby et al. |
| 6,011,795 A | 1/2000 | Varghese et al. |
| 6,014,659 A | 1/2000 | Wilkinson, III |
| 6,018,524 A | 1/2000 | Turner et al. |
| 6,023,733 A | 2/2000 | Periasamy et al. |
| 6,047,323 A | 4/2000 | Krause |
| 6,052,683 A | 4/2000 | Irwin |
| 6,055,364 A | 4/2000 | Speakman |
| 6,061,712 A | 5/2000 | Tzeng |
| 6,067,574 A | 5/2000 | Tzeng |
| 6,078,590 A | 6/2000 | Farinacci et al. |
| 6,091,725 A | 7/2000 | Cheriton et al. |
| 6,101,115 A | 8/2000 | Ross |
| 6,111,877 A | 8/2000 | Wilford |
| 6,122,279 A | 9/2000 | Milway et al. |
| 6,147,996 A | 11/2000 | Laor |
| 6,157,641 A | 12/2000 | Wilford |
| 6,167,438 A | 12/2000 | Yates et al. |
| 6,182,139 B1 | 1/2001 | Brendel |
| 6,212,183 B1 | 4/2001 | Wilford |
| 6,219,699 B1 | 4/2001 | McCloghrie et al. |
| 6,308,148 B1 | 10/2001 | Bruins et al. |
| 6,343,322 B2 | 1/2002 | Nagami et al. |

FOREIGN PATENT DOCUMENTS

| | | |
|---|---|---|
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |
| WO | WO95/20850 A1 | 8/1995 |
| WO | WO 96/34479 | 10/1996 |
| WO | WO96/34479 A1 | 10/1996 |
| WO | WO 99/17182 | 4/1999 |
| WO | WO99/17182 A2 | 4/1999 |

OTHER PUBLICATIONS

Pei et al., VLSI Implementation of Routing Tables: Tries and Cams, IEEE, 1991, pp. 515-524.

Cao et al., Performance of Hashing-Based Schemes for Internet Load Balancing, IEEE, 2000, pp. 332-341.

Newman et al., "IP Switching and Gigabit Routers," IEEE, 1997, pp. 64-69.

Worster et al., "Levels of Aggregation in Flow Switching Networks," IEEE, 1997, pp. 51-59.

Allen, M., "Novell IPX Over Various WAN Media (IPXW AN)," Network Working Group, RFC 1551, Dec. 1993, pp. 1-22.

Becker, D., "3c589.c: A 3c589 EtherLink3 ethernet driver for linux," becker @CESDIS.gsfc.nasa.gov, May 3, 1994, pp. 1-13.

Chowdhury, et al., "Alternative Bandwidth Allocation Algorithums for Packet Video in ATM Networks," INFOCOM 1992, pp. 1061-1068.

Doeringer, W., "Routing on Longest-Matching Prefixes," IEEE/ACM Transactions in Networking, vol. 4, No. 1, Feb. 1996, pp. 86-97.

Esaki, et al., "Datagram Delivery in an ATM-Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409-411.

Pei, et al., "Putting Routing Tables in Silicon," IEEE Network Magazine, Jan. 1992, pp. 42-50.

Perkins, D., "Requirements for an Internet Standard Point-to-Point Protocol," Network Working Group, RFC 1547, Dec. 1993, pp. 1-19.

Simpson, W., "The Point-to-Point Protocol (PPP)," Network Working Group, RFC 1548, Dec. 1993, pp. 1-53.

Tsuchiya, P.F., "A Search Algorithm for Table Entries with Non-Contiguous Wildcarding," Abstract, Bellcore.

Zhang, et al., "Rate-Controlled Static-Priority Queueing," INFOCOM 1993, pp. 227-236.

William Stallings, Data and Computer Communications pp. 329-333, Prentice Hall, Upper Saddle river, New Jersey 07458.

Awerbuch et al., Sparse Partitions, IEEE, 1990, pp. 503-513.

Bouboutas et al., Some Graph Partitioning Problems and Algorithms Related to Routing in Large Computer Networks, IEEE, 0989, pp. 362-370.

Anderson, Thomas E. et al. "High Speed Switch Scheduling for Local-Area networks". IEEE. pp. 319-352. Dated Nov. 1993.

Sangoma Technologies Inc. "Frame Relay Fast Packet Switching". Frame Relay Tutorial. 1999.

McKeown, Nicholas William. "Scheduling Algorithms for Input-Quented Cells Switches". Dated 1995.

McKeown, Nicholas et al. "Sceduling Cells in an Input-Queued Switch". IEEE Electronics Letters. Dec. 9, 1993, pp. 2174-2175.

Newman et al. "Flow Labelled IP: A Connectionless Approach to ATM". IEEE, 1996, pp. 1251-1260.

Prabhaker, Balaji et al., "Multicast Scheduling for Input-Queued Switches". IEEE Journal of Selected Areas in Communications, vol. 15, No. 5, pp. 1-23, 855-866.

Le, My T. et al. The BayBridge: A High Speed Bridge/Router Between FDDI and SMDS part II-the SMDS interface and DQDB MAC Chip. IEEE Trans Networking (to appear).

Mah, Bruce A. "Measurements and Observations of IP Multicast Traffic".

McKeown, Nick et al. "Achieving 100% Throughout in an Input-Queued Switch". Stanford & UC Berkeley. pp. 1-22.

McKeown, Nicholas et al. "Bridges, Routers, and Switches". Stanford University.

McKeown, Nicholas et al. "A Quantitative Comparsion ??????????? Algorithms for Input-Queued Switches".

Gupta, Pankaj et al. "Scheduling Algorithms for an Input-Queued Variable Length Packet Switch". Stanford University.

Jensen, Bent T. "Access Networking". pp. 08.

Karol, Mark J. et al. "Input Output Queuing on a Space-Division Packet Switch". IEEE. pp. 59-68. Dated: Dec. 1987.

Chuang, Shang-Tse et al. "Matching Ouput Queuing with a Combined Input and Output Queued Switch". pp. 1-25.

Cisco Systems, Inc. "NetFlow Services and Applications (White Paper)". 1999.

Demers, A. et al. "Analysis and Simulation of a Fair Queuing Algorithm". Proceedings ACM SIGcomm, pp. 1-12, Sep. 1989.

Duffy, Jim."Cisco Goes With The Flow". Network World, Apr. 22, 1996.

Girish et al. "Trading Packet Headers for Packet Processing". IEEE, 1996, pp. 141-152.

Girish Chandranmenon et al., "Trading Packet Headers For Packet Processing," IEEE, Apr. 1996, pp. 141-152.

Sangoma Technologies, Inc., "Frame Relay Packet Switching," Frame Relay Tutorial, 1999, 3 pages.

Nicholas William McKeown, et al., "Scheduling Algorithms For Input Quented Cells Switches," 1995, 118 pages.

Bruce A. Mah, "Measurements And Observations Of IP Multicast Traffic," pp. 1-12.

Nick McKeown, et al., "Achieving 100% Throughout In An Input Queed Switch," pp. 1-22.

Nick McKeown, et al., "The Baybridge: A High Speed Bridge/Router," Presented at IFIP PFHSN Workshop, Stockholm, Sweden, May 1992, Project Report: 12, Revision: 2.0, pp. 1-18.

Nick McKeown, et al., "Bridges, Routers, And Switches," 112 pages.

Nick McKeown, et al., "A Quantitative Comparsion of Scheduling Algorithms For Input-Queed Switches," pp. 1-16.

Pankaj Gupta, et al., "Scheduling Algorithms For An Input Queed Variable Length Packet Switch," Stanford University, pp. 1-34.

Brent T. Jensen, "Access Networking", pp. 1-8.

Cisco Systems, Inc., "Net Flow Services And Applications (White Paper)", 1999, pp. 1-27.

NETWORK FLOW SWITCHING AND FLOW DATA REPORT

CROSS-REFERENCE TO RELATED APPLICATIONS; PRIORITY CLAIM

This application claims benefit as a Continuation of application Ser. No. 08/886,900, filed Jul. 2, 1997 and now issued as U.S. Pat. No. 6,889,181 B2, which is a Continuation of application Ser. No. 08/655,429, filed May 28, 1996 and now issued as U.S. Pat. No. 6,243,667 and of application Ser. No. 08/771,438, filed Dec. 20, 1996 and now issued as U.S. Pat. No. 6,308,148, the entire contents of which are hereby incorporated by reference as if fully set forth herein, under 35 U.S.C. §120.

BACKGROUND OF THE INVENTION

1. Field of the Invention

This invention relates to network switching and data export responsive to message flow patterns.

2. Description of Related Art

In computer networks, it commonly occurs that message traffic between a particular source and a particular destination will continue for a time with unchanged routing or switching parameters. For example, when using the file-transfer protocol "FTP" there is substantial message traffic between the file's source location and the file's destination location, comprising the transfer of many packets which have similar headers, differing in the actual data which is transmitted. During the time when message traffic continues, routing and switching devices receiving packets comprising that message traffic must examine those packets and determine the processing thereof.

One problem which has arisen in the art is that processing demands on routing and switching devices continue to grow with increased network demand. It continues to be advantageous to provide techniques for processing packets more quickly. This problem has been exacerbated by addition of more complex forms of processing, such as the use of access control lists.

It would therefore be advantageous to provide techniques in which the amount of processing required for any individual packet could be reduced. With inventive techniques described herein, information about message flow patterns is used to identify packets for which processing has already been determined, and therefore to process those packets without having to re-determine the same processing. The amount of processing required for any individual packet is therefore reduced.

Information about message flow patterns would also be valuable for providing information about use of the network, and could be used for a variety of purposes by network administrators, routing devices, service providers, and users.

Accordingly, it would be advantageous to provide a technique for network switching and data export responsive to message flow patterns.

SUMMARY OF THE INVENTION

The invention provides a method and system for switching in networks responsive to message flow patterns. A message "flow" is defined to comprise a set of packets to be transmitted between a particular source and a particular destination. When routers in a network identify a new message flow, they determine the proper processing for packets in that message flow and cache that information for that message flow. Thereafter, when routers in a network identify a packet which is part of that message flow, they process that packet according to the proper processing for packets in that message flow. The proper processing may include a determination of a destination port for routing those packets and a determination of whether access control permits routing those packets to their indicated destination.

In another aspect of the invention, information about message flow patterns is collected, responsive to identified message flows and their packets. The collected information is reported to devices on the network. The collected information is used for a variety of purposes, including: to diagnose actual or potential network problems, to determine patterns of usage by date and time or by location, to determine which services and which users use a relatively larger or smaller amount of network resources, to determine which services are accessed by particular users, to determine which users access particular services, or to determine usage which falls within selected parameters (such as: access during particular dates or times, access to prohibited services, excessive access to particular services, excessive use of network resources, or lack of proper access).

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

MESSAGE FLOWS

Figure 1:
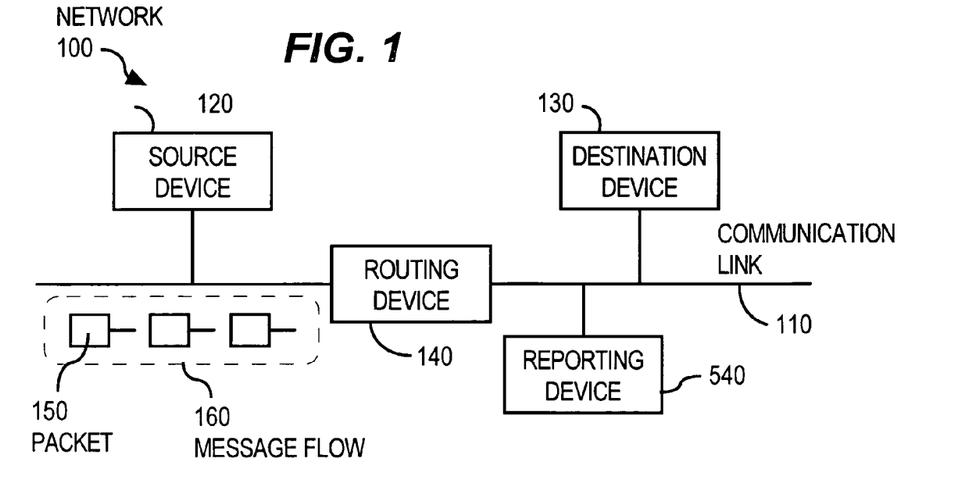
FIG. 1 shows a network in which routing responsive to message flow patterns is performed.

FIG. 1 shows a network in which routing responsive to message flow patterns is performed.

A network 100 includes at least one communication link 110, at least one source device 120, at least one destination device 130, and at least one routing device 140. The routing device 140 is disposed for receiving a set of packets 150 from the source device 120 and routing them to the destination device 130.

The communication link 110 may comprise any form of physical media layer, such as ethernet, FDDI, or HDLC serial link.

The routing device 140 comprises a routing processor for performing the process steps described herein, and may include specific hardware constructed or programmed performing the process steps described herein, a general purpose processor operating under program control, or some combination thereof.

A message flow 160 consists of a unidirectional stream of packets 150 to be transmitted between particular pairs of transport service access points (thus, network-layer addresses and port numbers). In a broad sense, a message flow 160 thus refers to a communication "circuit" between communication endpoints. In a preferred embodiment, a message flow 160 is defined by a network-layer address for a particular source device 120, a particular port number at the source device 120, a network-layer address for a particular destination device 130, a particular port number at the destination device 130, and a particular transmission protocol type. For example, the transmission protocol type may identify a known transmission protocol, such as UDP, TCP, ICMP, or IGMP (internet group management protocol).

In a preferred embodiment for use with a network of networks (an "internet"), the particular source device 120 is identified by its IP (internet protocol) address. The particular port number at the source device 120 is identified by either a port number which is specific to a particular process, or by a standard port number for the particular transmission protocol type. For example, a standard port number for the TCP protocol type is 6 and a standard port number for the UDP protocol type is 17. Other protocols which may have standard port numbers include the FTP protocol, the TELNET protocol, an internet telephone protocol, or an internet video protocol such as the "CUSeeMe" protocol; these protocols are known in the art of networking. Similarly, the particular destination device 130 is identified by its IP (internet protocol) address; the particular port number at the destination device 130 is identified by either a port number which is specific to a particular process, or a standard port number for the particular transmission protocol type.

It will be clear to those skilled in the art, after perusing this application, that the concept of a message flow is quite broad, and encompasses a wide variety of possible alternatives within the scope and spirit of the invention. For example, in alternative embodiments, a message flow may be bi-directional instead of unidirectional, a message flow may be identified at a different protocol layer level than that of transport service access points, or a message flow may be identified responsive to other factors. These other factors may include one or more of the following: information in packet headers, packet length, time of packet transmission, or routing conditions on the network (such as relative network congestion or administrative policies with regard to routing and transmission).

NETWORK FLOW SWITCHING

Figure 2:
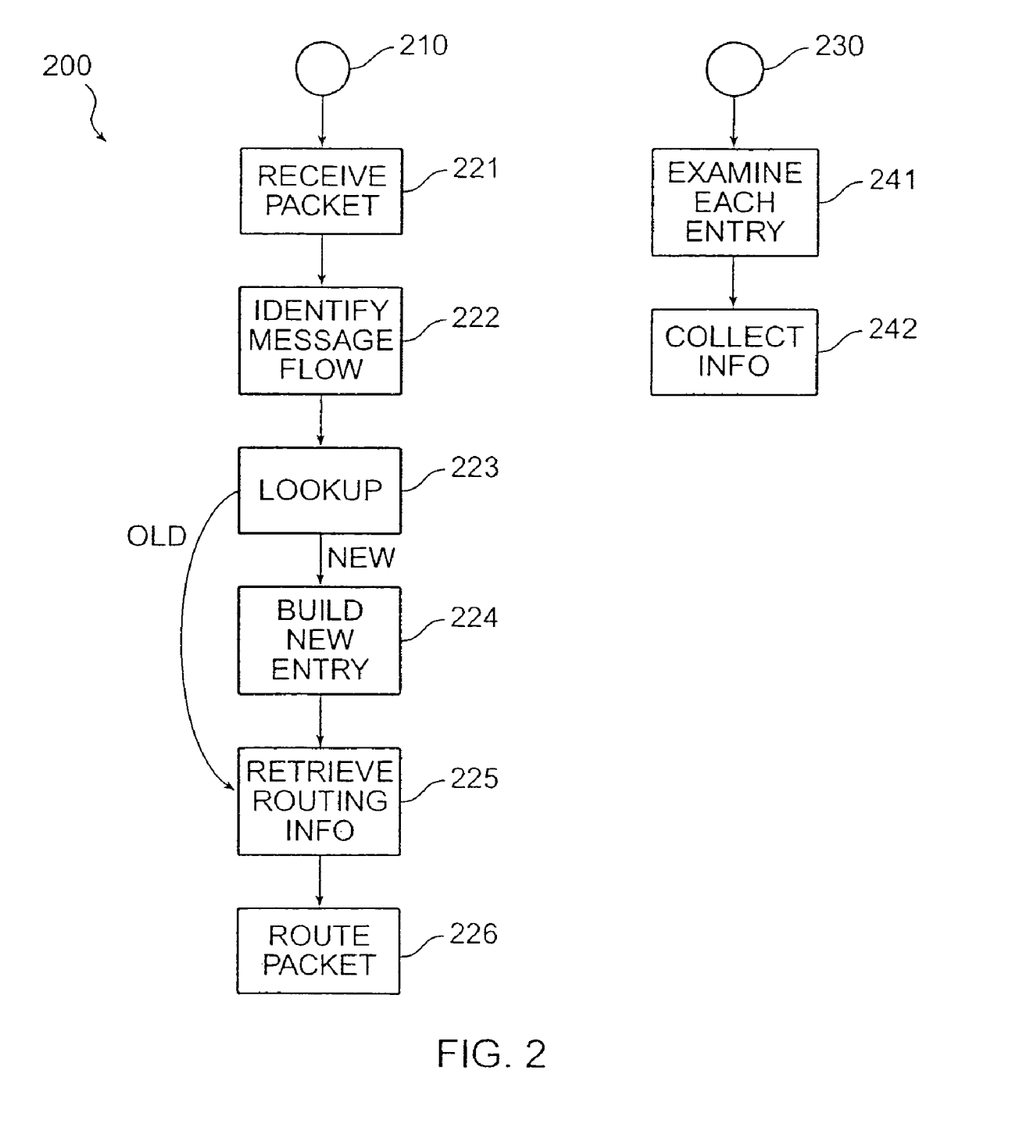
FIG. 2 shows a method for routing in networks responsive to message flow patterns.

FIG. 2 shows a method for routing in networks responsive to message flow patterns.

In broad overview, the method for routing in networks responsive to message flow patterns comprises two parts. In a first part, the routing device 140 builds and uses a flow cache (described in further detail with regard to FIG. 3), in which routing information to be used for packets 150 in each particular message flow 160 is recorded and from which such routing information is retrieved for use. In a second part, the routing device 140 maintains the flow cache, such as by removing entries for message flows 160 which are no longer considered valid.

A method 200 for routing in networks responsive to message flow patterns is performed by the routing device 140.

At a flow point 210, the routing device 140 is disposed for building and using the flow cache.

At a step 221, the routing device 140 receives a packet 150.

At a step 222, the routing device 140 identifies a message flow 160 for the packet 150. In a preferred embodiment, the routing device 140 examines a header for the packet 150 and identifies the IP address for the source device 120, the IP address for the destination device 130, and the protocol type for the packet 150. The routing device 140 determines the port number for the source device 120 and the port number for the destination device 130 responsive to the protocol type. Responsive to this set of information, the routing device 140 determines a flow key 310 (described with reference to FIG. 3) for the message flow 160.

At a step 223, the routing device 140 performs a lookup in a flow cache for the identified message flow 160. If the lookup is unsuccessful, the identified message flow 160 is a "new" message flow 160, and the routing device 140 continues with the step 224. If the lookup is successful, the identified message flow 160 is an "old" message flow 160, and the routing device 140 continues with the step 225.

In a preferred embodiment, the routing device 140 determines a hash table key responsive to the flow key 310. This aspect of the step 223 is described in further detail with regard to FIG. 3.

Figure 4:
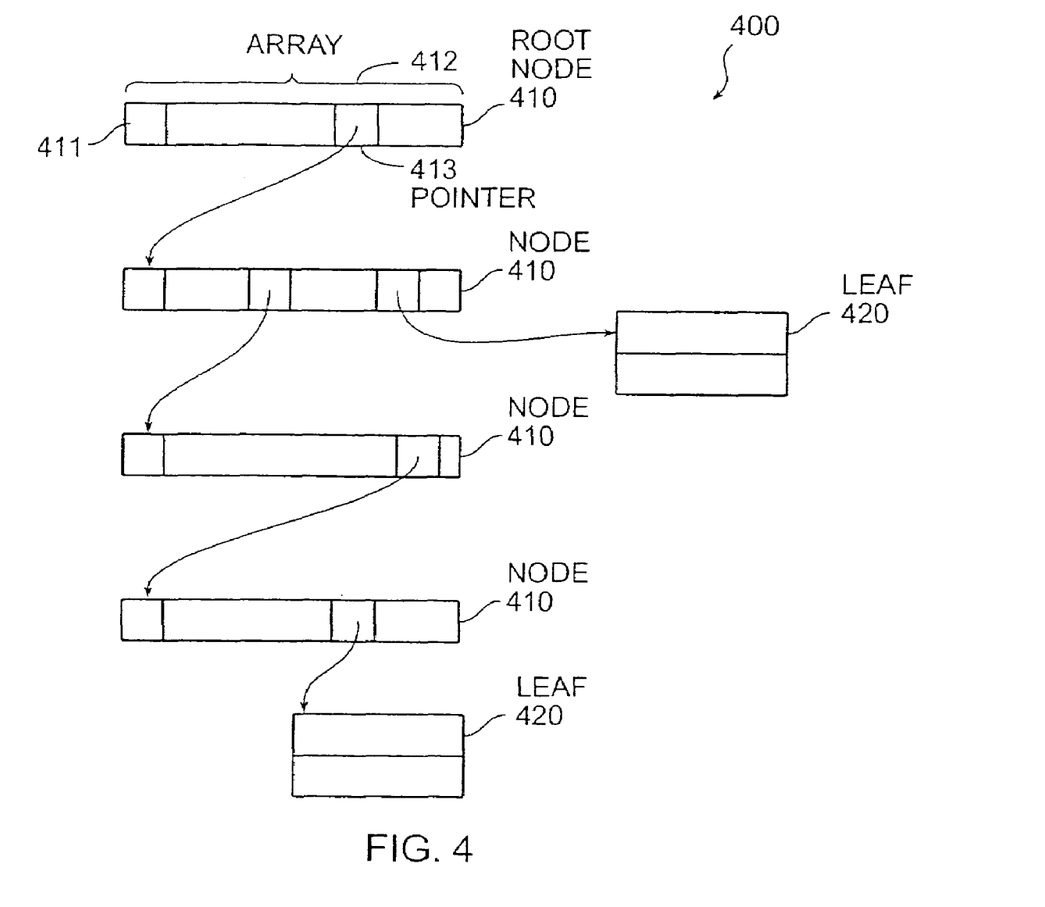
FIG. 4 shows an IP address cache for use with a method for routing in networks responsive to message flow patterns.

At a step 224, the routing device 140 builds a new entry in the flow cache. The routing device 140 determines proper treatment of packets 150 in the message flow 160 and enters information regarding such proper treatment in a data structure pointed to by the new entry in the flow cache. In a preferred embodiment, the routing device 140 determines the proper treatment by performing a lookup in an IP address cache as shown in FIG. 4.

In a preferred embodiment, the proper treatment of packets 150 in the message flow 160 includes treatment with regard to switching (thus, the routing device 140 determines an output port for switching packets 150 in the message flow 160), with regard to access control (thus, the routing device 140 determines whether packets 150 in the message flow 160 meet the requirements of access control, as defined by access control lists in force at the routing device 140), with regard to accounting (thus, the routing device 140 creates an accounting record for the message flow 160), with regard to encryption (thus, the routing device 140 determines encryption treatment for packets 150 in the message flow 160), and any special treatment for packets 150 in the message flow 160.

In a preferred embodiment, the routing device 140 performs any special processing for new message flows 160 at this time. For example, in one preferred embodiment, the routing device 140 requires that the source device 120 or the destination device 130 must authenticate the message flow 160. In that case, the routing device 140 transmits one or more packets 150 to the source device 120 or the destination device 130 to request information (such as a user identifier and a password) to authenticate the new message flow 160, and receives one or more packets 150 comprising the authentication information. This technique could be useful for implementing security "firewalls" and other authentication systems.

Thereafter, the routing device 140 proceeds with the step 225, using the information from the new entry in the flow cache, just as if the identified message flow 160 were an "old" message flow 160 and the lookup in a flow cache had been successful.

At a step 225, the routing device 140 retrieves routing information from the entry in the flow cache for the identified message flow 160.

In a preferred embodiment, the entry in the flow cache includes a pointer to a rewrite function for at least part of a header for the packet 150. If this pointer is non-null, the routing device 140 invokes the rewrite function to alter the header for the packet 150.

At a step 226, the routing device 140 routes the packet 150 responsive to the routing information retrieved at the step 225.

Thus, in a preferred embodiment, the routing device 140 does not separately determine, for each packet 150 in the message flow 160, the information stored in the entry in the flow cache. Rather, when routing a packet 150 in the message flow 160, the routing device 140 reads the information from the entry in the flow cache and treats the packet 150 according to the information in the entry in the flow cache.

Thus, in a preferred embodiment, the routing device 140 routes the packet 150 to an output port, determines whether access is allowed for the packet 150, determines encryption treatment for the packet 150, and performs any special treatment for the packet 150, all responsive to information in the entry in the flow cache.

In a preferred embodiment, the routing device 140 also enters accounting information in the entry in the flow cache for the packet 150. When routing each packet 150 in the message flow 160, the routing device 140 records the cumulative number of packets 150 and the cumulative number of bytes for the message flow 160.

Because the routing device 140 processes each packet 150 in the message flow 160 responsive to the entry for the message flow 160 in the flow cache, the routing device 140 is able to implement administrative policies which are designated for each message flow 160 rather than for each packet 150. For example, the routing device 140 is able to reserve specific amounts of bandwidth for particular message flows 160 and to queue packets 150 for transmission responsive to the bandwidth reserved for their particular message flows 160.

Because the routing device 140 is able to associate each packet 150 with a particular message flow 160 and to associate each message flow 160 with particular network-layer source and destination addresses, the routing device 140 is able to associate network usage with particular workstations (and therefore with particular users) or with particular services available on the network. This can be used for accounting purposes, for enforcing administrative policies, or for providing usage information to interested parties.

For a first example, the routing device 140 is able to monitor and provide usage information regarding access using the HTTP protocol to world wide web pages at particular sites.

For a second example, the routing device 140 is able to monitor usage information regarding relative use of network resources, and to give priority to those message flows 160 which use relatively fewer network resources. This can occur when a first message flow 160 is using a relatively low-bandwidth transmission channel (such as a 28.8 kilobits per second modem transmission channel) and when a second message flow 160 is using a relatively high-bandwidth transmission channel (such as a T-1 transmission line).

At a flow point 230, the routing device 140 is disposed for maintaining the flow cache.

At a step 241, the routing device 140 examines each entry in the flow cache and compares a current time with a last time a packet 150 was routed using that particular entry. If the difference exceeds a first selected timeout, the message flow 160 represented by that entry is considered to have expired due to nonuse and thus to no longer be valid.

In a preferred embodiment, the routing device 140 also examines the entry in the flow cache and compares a current time with a first time a packet 150 was routed using that particular entry. If the difference exceeds a second selected timeout, the message flow 160 represented by that entry is considered to have expired due to age and thus to no longer be valid. The second selected timeout is preferably about one minute.

Expiring message flows 160 due to age artificially requires that a new message flow 160 must be created for the next packet 150 in the same communication session represented by the old message flow 160 which was expired. However, it is considered preferable to do so because it allows information to be collected and reported about message flows 160 without having to wait for those message flows 160 to expire from nonuse. For example, a multiple-broadcast communication session could reasonably last well beyond the time message flows 160 are expired for age, and if not so expired would mean that information about network usage would not account for significant network usage.

In a preferred embodiment, the routing device 140 also examines the entry in the flow cache and determines if the "next hop" information has changed. If so, the message flow 160 is expired due to changed conditions. Other changed conditions which might cause a message flow 160 to be expired include changes in access control lists or other changes which might affect the proper treatment of packets 150 in the message flow 160. The routing device 140 also expires entries in the flow cache on a least-recently-used basis if the flow cache becomes too full.

If the message flow 160 is still valid, the routing device 140 continues with the next entry in the flow cache until all entries have been examined. If the message flow 160 is no longer valid, the routing device 140 continues with the step 242.

At a step 242, the routing device 140 collects historical information about the message flow 160 from the entry in the flow cache, and deletes the entry.

FLOW CACHE

Figure 3:
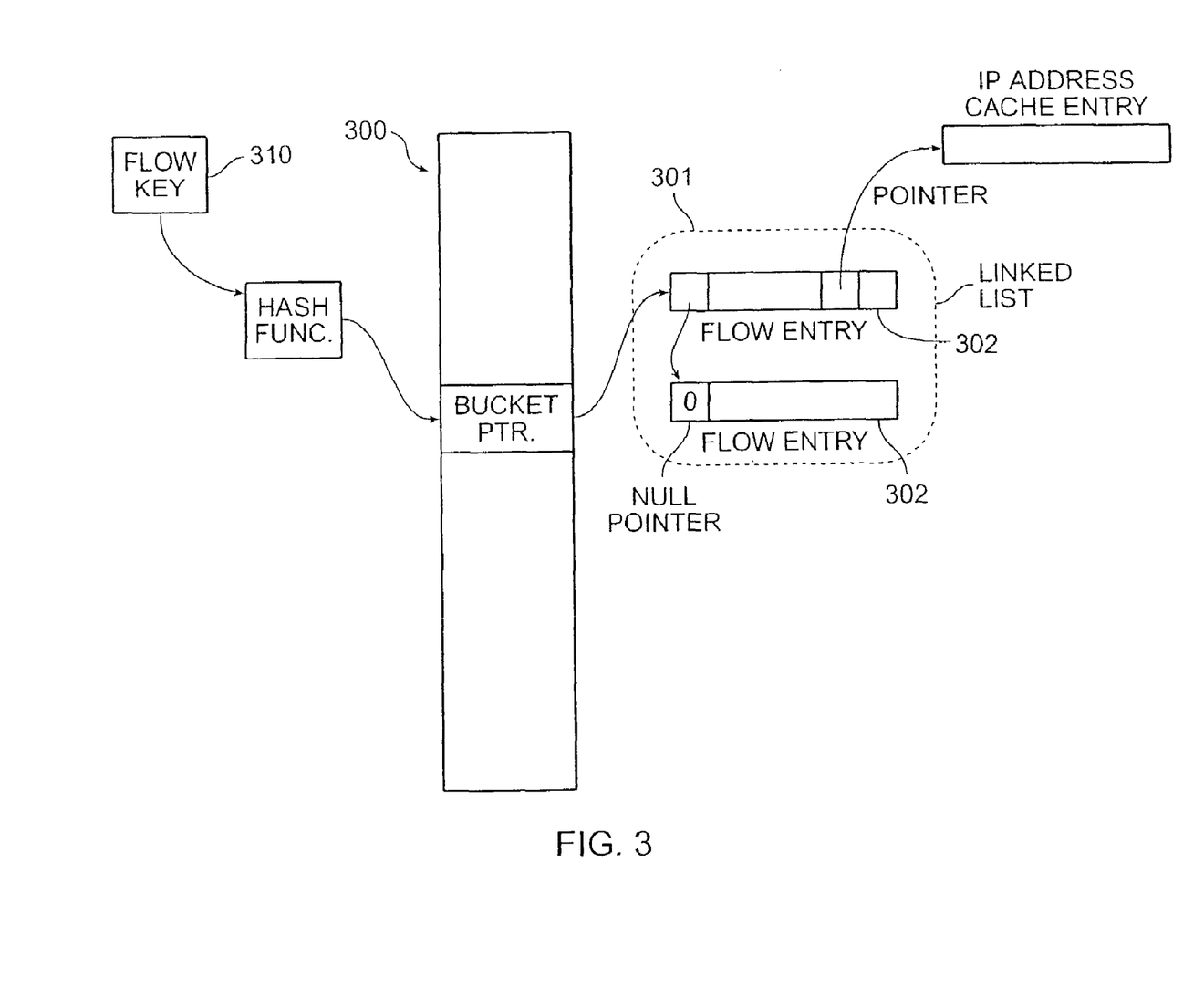
FIG. 3 shows data structures for use with a method for routing in networks responsive to message flow patterns.

FIG. 3 shows data structures for use with a method for routing in networks responsive to message flow patterns.

A flow cache 300 comprises a memory which associates flow keys 310 with information about message flows 160 identified by those flow keys 310. The flow cache 300 includes a set of buckets 301. Each bucket 301 includes a linked list of entries 302. Each entry 302 includes information about a particular message flow 160, including routing, access control, accounting, special treatment for packets 150 in that particular message flow 160, and a pointer to information about treatment of packets 150 to the destination device 130 for that message flow 160.

In a preferred embodiment, the flow cache 300 includes a relatively large number of buckets 301 (preferably about 16,384 buckets 301), so as to minimize the number of entries 302 per bucket 301 and thus so as to minimize the number of memory accesses per entry 302. Each bucket 301 comprises a four-byte pointer to a linked list of entries 302. The linked list preferably includes only about one or two entries 302 at the most.

In a preferred embodiment, each entry 302 includes a set of routing information, a set of access control information, a set of special treatment information, and a set of accounting information, for packets 150 in the message flow 160.

The routing information comprises the output port for routing packets 150 in the message flow 160.

The access control information comprises whether access is permitted for packets 150 in the message flow 160.

The accounting information comprises a time stamp for the first packet 150 in the message flow 160, a time stamp for the most recent packet 150 in the message flow 160, a cumulative count for the number of packets 150 in the message flow 160, and a cumulative count for the number of bytes 150 in the message flow 160.

IP ADDRESS CACHE

FIG. 4 shows an IP address cache for use with a method for routing in networks responsive to message flow patterns.

An IP address cache 400 comprises a tree having a root node 410, a plurality of inferior nodes 410, and a plurality of leaf data structures 420.

Each node 410 comprises a node/leaf indicator 411 and an array 412 of pointers 413.

The node/leaf indicator 411 indicates whether the node 410 is a node 410 or a leaf data structure 420; for nodes 410 it is set to a "node" value, while for leaf data structures 420 it is set to a "leaf" value.

The array 412 has room for exactly 256 pointers 413; thus, the IP address cache 400 comprises an M-trie with a branching width of 256 at each level. M-tries are known in the art of tree structures. IP addresses comprise four bytes, each having eight bits and therefore 256 possible values. Thus, each possible IP address can be stored in the IP address cache 400 using at most four pointers 413.

The inventors have discovered that IP addresses in actual use are unexpectedly clustered, so that the size of the IP address cache 400 is substantially less, by a factor of about five to a factor of about ten, than would be expected for a set of randomly generated four-byte IP addresses.

Each pointer 413 represents a subtree of the IP address cache 400 for its particular location in the array 412. Thus, for the root node 410, the pointer 413 at location 3 represents IP addresses having the form 3.xxx.xxx.xxx, where "x" represents any possible value from zero to 255. Similarly, in a subtree for IP addresses having the form 3.xxx.xxx.xxx, the pointer 413 at location 141 represents IP addresses having the form 3.141.xxx.xxx. Similarly, in a subtree for IP addresses having the form 3.141.xxx.xxx, the pointer 413 at location 59 represents IP addresses having the form 3.141.59.xxx. Similarly, in a subtree for IP addresses having the form 3.141.59.xxx, the pointer 413 at location 26 represents the IP address 3.141.59.26.

Each pointer 413 is either null, to indicate that there are no IP addresses for the indicated subtree, or points to inferior node 410 or data structure 420. A least significant bit of each pointer 413 is reserved to indicate the type of the pointed-to structure; that is, whether the pointed-to structure is a node 410 or a leaf data structure 420. In a preferred embodiment where pointers 413 must identify an address which is aligned on a four-byte boundary, the two least significant bits of each pointer 413 are unused for addressing, and reserving the least significant bit for this purpose does not reduce the scope of the pointer 413.

Each leaf data structure comprises information about the IP address, stored in the IP address cache 400. In a preferred embodiment this information includes the proper processing for packets 150 addressed to that IP address, such as a determination of a destination port for routing those packets and a determination of whether access control permits routing those packets to their indicated destination.

FLOW DATA EXPORT

Figure 5:
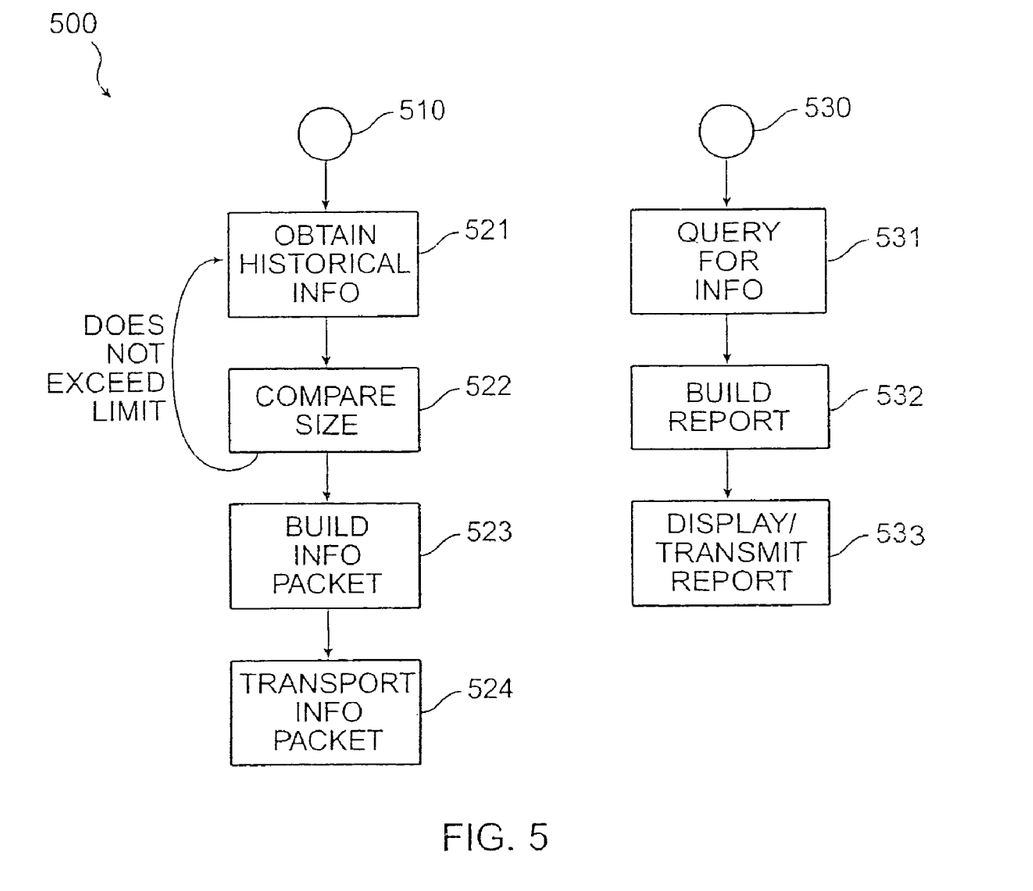
FIG. 5 shows a method for collecting and reporting information about message flow patterns.

FIG. 5 shows a method for collecting and reporting information about message flow patterns.

A method 500 for collecting and reporting information about message flow patterns is performed by the routing device 140.

At a flow point 510, the routing device 140 is disposed for obtaining information about a message flow 160. For example, in a preferred embodiment, as noted herein, the routing device 140 obtains historical information about a message flow 160 in the step 242. In alternative embodiments, the routing device 140 may obtain information about message flows 160, either in addition or instead, by occasional review of entries in the flow cache, or by directly monitoring packets 150 in message flows 160.

It will be clear to those skilled in the art, after perusing this application, that the concept of reporting information about message flows is quite broad, and encompasses a wide variety of possible alternatives within the scope and spirit of the invention. For example, in alternative embodiments, information about message flows may include bi-directional traffic information instead of unidirectional traffic information, information about message flows may include information at a different protocol layer level other than that of transport service access points and other than that at which the message flow is itself defined, or information about message flows may include actual data transmitted as part of the message flow itself. These actual data may include one or more of the following: information in packet headers, information about files of file names transmitted during the message flow, or usage conditions of the message flow (such as whether the message flow involves steady or bursty transmission of data, or is relatively interactive or relatively unidirectional).

At a step 521, the routing device 140 obtains historical information about a particular message flow 160, and records that information in a flow data table.

At a step 522, the routing device 140 determines a size of the flow data table, and compares that size with a selected size value. If the flow data table exceeds the selected size value, the routing device 140 continues with the step 523 to report flow data. If the flow data table does not exceed the selected size value, the routing device 140 returns to the step 521 to obtain historical information about a next particular message flow 160.

At a step 523, the routing device 140 builds an information packet, responsive to the information about message flows 160 which is recorded in the flow data table.

At a step 524, the routing device 140 transmits the information packet to a selected destination device 130 on the network 100. In a preferred embodiment, the selected destination device 130 is determined by an operating parameter of the routing device 140. This operating parameter is set when the routing device 140 is initially configured, and may be altered by an operator of the routing device 140.

In a preferred embodiment, the selected destination device 130 receives the information packet and builds (or updates) a database in the format for the RMON protocol. The RMON protocol is known in the art of network monitoring.

At a flow point 530, a reporting device 540 on the network 100 is disposed for reporting using information about message flows 160.

At a step 531, the reporting device 540 queries the selected destination device 130 for information about message flows 160. In a preferred embodiment, the reporting device 540 uses the RMON protocol to query the selected destination device 130 and to obtain information about message flows 160.

At a step 532, the reporting device 540 builds a report about a condition of the network 100, responsive to information about message flows 160.

At a step 533, the reporting device 540 displays or transmits that report about the condition of the network 100 to interested parties.

In preferred embodiments, the report may comprise one or more of a wide variety of information, and interested parties may use that information for one or more of a wide variety of purposes. Some possible purposes are noted herein:

Interested parties may diagnose actual or potential network problems. For example, the report may comprise information about packets 150 in particular message flows 160, including a time stamp for a first packet 150 and a time stamp for a last packet 150 in the message flow 160, a cumulative total number of bytes in the message flow 160, a cumulative total number of packets 150 in the message flow 160, or other information relevant to diagnosing actual or potential network problems.

Interested parties may determine patterns of usage of the network by date and time or by location. For example, the report may comprise information about which users or which services on the network are making relatively heavy use of resources. In a preferred embodiment, usage of the network 100 is displayed in a graphical form which shows use of the network 100 in a false-color map, so that network administrators and other interested parties may rapidly determine which services, which users, and which communication links are relatively loaded or relatively unloaded with demand.

Interested parties may determine which services are accessed by particular users, or which users access particular services. For example, the report may comprise information about which services are accessed by particular users at a particular device on the network 100, or which users access a particular service at a particular device on the network 100. This information may be used to market or otherwise enhance these services. In a preferred embodiment, users who access a particular world wide web page using the HTTP protocol are recorded, and information is sent to those users about changes to that web page and about further services available from the producers of that web page. Providers of the particular web page may also collect information about access to their web page in response to date and time of access, and location of accessing user.

Information about patterns of usage of the network, or about which services are accessed by particular users, or which users access particular services, may be used to implement accounting or billing for resources, or to set limits for resource usage, such as by particular users, by particular service providers, or by particular protocol types (and therefore by particular types of services).

Interested parties may determine usage which falls within (or without) selected parameters. These selected parameters may involve access during particular dates or times, such as for example access to particular services during or outside normal working hours. For example, it may be desirable to record those accesses to a company database which occur outside normal working hours.

These selected parameters may involve access to prohibited services, excessive access to particular services, or excessive use of network resources, such as for example access to particular servers using the HTTP protocol or the FTP protocol which fall within (or without) a particular administrative policy. For example, it may be desirable to record accesses to repositories of games or other recreational material, particularly those accesses which occur within normal working hours.

These selected parameters may involve or lack of proper access, such as for example access control list failures or unauthorized attempts to access secure services. For example, it may be desirable to record unauthorized attempts to access secure services, particularly those attempts which form a pattern which might indicate a concerted attempt to gain unauthorized access.

In alternative embodiments, the routing device 140 could save the actual packets 150 for the message flow 160, or some part thereof, for later examination. For example, a TELNET session (a message flow 160 comprising use of the TELNET protocol by a user and a host) could be recorded in its entirety, or some portion thereof, for later examination, e.g., to diagnose problems noted with the network or with the particular host.

In further alternative embodiments, the routing device 140 could save the actual packets 150 for selected message flows 160 which meet certain selected parameters, such as repeated unauthorized attempts to gain access.

In embodiments where actual packets 150 of the message flow 160 are saved, it would be desirable to perform a name translation (such as a reverse DNS lookup), because the IP addresses for the source device 120 and the destination device 130 are transitory. Thus, it would be preferable to determine the symbolic names for the source device 120 and the destination device 130 from the IP addresses, so that the recorded data would have greater meaning at a later time.

ALTERNATIVE EMBODIMENTS

Although preferred embodiments are disclosed herein, many variations are possible which remain within the concept, scope, and spirit of the invention, and these variations would become clear to those skilled in the art after perusal of this application.

Filtering and Reporting of Flow Data

Figure 6:
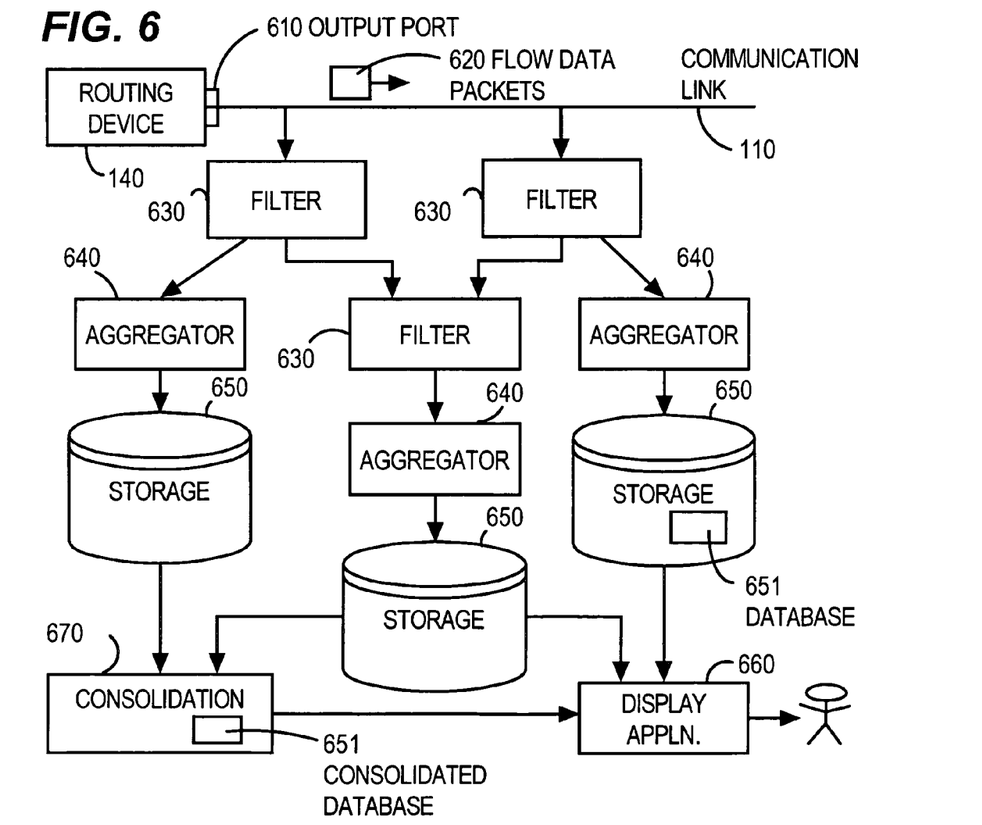
FIG. 6 shows an example network in which message flow information is filtered and reported.

FIG. 6 shows an example network in which message flow information is filtered and reported.

The routing device 140 includes an output port 610, at which the routing device 140 outputs flow data packets 620 comprising message flow information. The output port 610 is coupled to a communication link 110, to which devices may be coupled to receive the flow data packets 620.

A set of filters 630 (including at least one filter 630 and preferably a plurality of filters 630), are coupled to the communication link 110, and receive the flow data packets 620. Each of the filters 630 parses the flow data packets 620, and compares those flow data packets 620 with a set of selected criteria to determine if those flow data packets 620 should be considered or should be filtered out of consideration.

In a preferred embodiment, the set of selected criteria for one particular filter 630 includes a single criterion, although there is no particular reason (except perhaps speed) that one of the filters 630 cannot process more than one criterion simultaneously.

For a first example, a first one of the filters 630 can select flow data packets 620 which relate to message flows 160 having a selected range of source addresses, such as flow data packets 620 for message flows 160 which originate from the internet domain "cisco.com". For a second example, a second one of the filters 630 can select flow data packets 620 which relate to message flows 160 having a selected protocol type, such as flow data packets 620 for message flows 160 which use the "FTP" protocol.

A set of secondary filters 630 can each be coupled to a set of primary filters 630, and operate to compare flow data packets 620 with a further set of selected criteria. In a preferred embodiment, the secondary filters 630 can each be coupled to a plurality of primary filters 630, so as to operate on a set union of flow data packets 620 selected by each of the primary filters 630.

For example, in the embodiment shown in the figure, a first primary filter 630 operates to select flow data packets 620 which relate to message flows 160 having a selected range of source addresses, such as flow data packets 620 for message flows 160 which originate from the internet domain "cisco.com", while a second primary filter 630 operates to select flow data packets 620 which relate to message flows 160 having a selected protocol type, such as flow data packets 620 for message flows 160 which use the "FTP" protocol. A secondary filter 630 is coupled to both the first primary filter 630 and the second primary filter 630, and operates to select a subset of those flow data packets 620 selected by either the first primary filter 630 or the second primary filter 630.

The selection criteria applied by the secondary filter 630 are similar to the selection criteria applied by any of the primary filters 630; thus the secondary filters 630 are like the primary filters 630 except for being coupled to flow data packets 620 selected by the primary filters 630 rather than flow data packets 620 output by the routing device 140.

Similar to the secondary filter 630, there can be a tertiary filter 630 which selects flow data packets 620 from those selected by secondary filters 630, or by a combination of those selected by primary filters 630 and those selected by secondary filters 630, or by a combination of original flow data packets 620, those selected by primary filters 630 and those selected by secondary filters 630. There can similarly be fourth-level filters 630, and so on, to combine the filtering results of each set of filters 630.

An aggregator 640 is coupled to each of the filters 630, and collects flow data packets 620 passed by its associated filter 630. Thus, each of the aggregators 640 collects a set of flow data packets 620 which relate to the criteria selected by its associated filter 630 and records aggregated information relating to those flow data packets 620 at a storage element 650. The storage elements 650 record the aggregated information in one or more databases 651 located at those locations.

A display application 660 is coupled to one or more storage elements 650, accesses the databases 651, and provides a display of information for an operator. In a preferred embodiment, the operator can comprise an individual who uses the display application 660, or can comprise an application program which is coupled to the display application.

A consolidation element 670 is coupled to one or more storage elements 650 and operates to consolidate the databases 651 stored at those storage elements 650 to create a consolidated database 651. The display application 660 can be coupled to the consolidated database 651 instead of or as well as the individual databases 651, and can operate to display information in the consolidated database 651 instead of or as well as the individual databases 651.

Types of Display Applications

The display application 660 provides information to the operator gleaned from the database 651, such as the following:

The display application 660 can record accounting information, which can be used to charge users of the network 100 for their use. For example, users can be charged for network usage in response to total number of bytes, total number of packets, average transmission bandwidth, or peak transmission bandwidth.

Although individual message flows 160 are not identified with regard to particular users, individual message flows 160 can be identified with regard to particular source devices 120, which can in many cases be in turn identified with regard to particular users.

The display application 660 can record events deemed "interesting," such as attempts to violate access control lists, other security rules, or other administrative policies; initiation or use of particular protocols; or initiation of each message flow 160. For some applications it can be desirable to record initiation of every message flow 160. For relatively short message flows 160, the display application 660 can record the entire actual message flow 160 itself.

Although it might be difficult to determine for an individual message flow 160 whether or not that message flow 160 violates one or more administrative policies, it is possible to record particular information about each individual message flow 160 and to provide a secondary display application with that information so as to determine if any administrative policy has been violated.

The display application 660 can show state information about the network 100, including the frequency of packets, number of bytes, number of packets, and average size of packets transmitted on particular communication links 110. The display application 660 can distinguish this information by protocol type, by ultimate destination (such as whether the packets transmitted on a communication link 110 are destined for a destination device 130 coupled to that communication link 110, or are instead destined for a destination device 130 coupled to a different communication link 110 (by way of a routing device 140 coupled to that communication link 110).

State information about the network 100 can be used to determine whether particular communication links 110 are congested, are heavily used, are lightly used, or are even inoperative. Network administrators can use this information to determine which communication links 110 require maintenance and how often, and can use this information for capacity planning for the network 100.

Router Use of Exported Flow Data

The display application 660 is also coupled to the routing device 140 so as to provide the display results to the routing device 140 for altering, augmenting, or modifying the operation of the routing device 140. Thus, the display application 660 provides information to the routing device 140 for use in routing packets 150, such as the following:

The routing device 140 can use information from the display application 660 to attempt to balance transmission of packets 150 in the network 100 to avoid overloading busy communication links 110 or routing devices 140. Balancing transmission of packets 150 can be directed to raw measures of traffic throughput, such as total number of bytes, total number of packets, average transmission bandwidth, or peak transmission bandwidth, or can be directed to administrative policy modifications of those raw measures, such as assigning a dollar cost to particular resources or resource measures.

Naturally the router 140 can also use information from the display application 660 in conjunction with information available to the router 140 from the routing protocol it uses (such as IGRP or EIGRP).

The routing device 140 can use information from the display application 660 to attempt to balance transmission of packets 150 in the network 100 to achieve fairness among a plurality of users of the network 100. As with balancing transmission of packets 150, fairness among a plurality of users can be directed to raw measures of traffic throughput, such as total number of bytes, total number of packets, average transmission bandwidth, or peak transmission bandwidth, or can be directed to administrative policy modifications of those raw measures, such as assigning a dollar cost to particular resources or resource measures.

The measure of "fairness" to individual users can be adjusted to account for other administrative policies, such as adjusting pricing measures at different times of day, adjusting pricing measures in response to relative loading, granting greater access or preferential access to particular users or preferred classes of users, or granting greater access or preferential access to particular message flows 160 or preferred classes of message flows 160. For example, internet telephony could be granted preferential access on the grounds that it is a real time application; alternatively, internet telephony could have its access reduced in priority on the grounds that it generates excessive traffic.

The routing device 140 can use information from the display application 660 to achieve particular measures of quality of service or to prioritize different types of traffic, in response to relative loading of particular types of message flows 160.

For a first example, the routing device 140 can limit particular users to no more network bandwidth than paid for. For a second example, the routing device 140 can assign relative priorities to particular protocols used in message flows 160 in response to the amount of network bandwidth actually being used for those particular protocols.

The routing device 140 can use information from the display application 660 to enforce particular administrative rules for limiting network traffic or routing.

For a first example, the routing device 140 can limit use of particular protocols to no more than a selected fraction of network bandwidth (such as a limit of 10% of network bandwidth for HTTP transfers). For a second example, the routing device 140 can limit use of network bandwidth to particular destination devices 130 or can limit use of particular protocols within selected time period.

Naturally, the number of possible administrative policies is limited only by the imagination of administrators, so long as those administrative policies are responsive to information which can be collected and reported by the display application 660.

Breadth of Flow Data Export Concept

It will be clear to those skilled in the art, after perusing this application, that the concept of reporting information about message flows is quite broad, and encompasses a wide variety of possible alternatives within the scope and spirit of the invention. For example, in alternative embodiments, information about message flows may include bidirectional traffic information instead of unidirectional traffic information, information about message flows may include information at a different protocol layer level other than that of transport service access points and other than that at which the message flow is itself defined, or information about message flows may include actual data transmitted as part of the flow itself.

What is claimed is:

1. A computer-implemented method, comprising:
   receiving a first packet in a set of packets to be transmitted between a source and a destination;
   based on the first packet, identifying a source address, a destination address, a source port, a destination port, and a protocol type;
   determining that a cache does not include a first entry that corresponds to the set of packets, based on the source address, the destination address, the source port, the destination port, and the protocol type;
   adding to the cache a second entry that corresponds to the set of packets;
   based on the first packet in the set of packets, updating the second entry to include information;
   receiving a second packet in the set of packets;
   based on the second packet, identifying the source address, the destination address, the source port, the destination port, and the protocol type;
   determining that the cache includes the second entry that corresponds to the set of packets, based on the source address, the destination address, the source port, the destination port, and the protocol type; and
   based on the second packet in the set of packets, updating the second entry to include information.

2. A method as recited in claim 1, further comprising:
   obtaining routing information for the first packet, based on the source address, the destination address, the source port, the destination port, and the protocol type;
   based on the routing information, routing the first packet;
   updating the second entry to include the routing information;
   based on the second entry in the cache, obtaining the routing information for the second packet; and
   based on the routing information, routing the second packet.

3. A method as recited in claim 1, wherein the set of packets is a flow; the cache is flow cache; the method is performed by a routing device; and the method further comprises:
   determining a flow key based on the source address, the destination address, the source port, the destination port, and the protocol type; and
   including the flow key in the second entry.

4. A method as recited in claim 1, wherein the set of packets is a stream.

5. A method as recited in claim 1, further comprising reserving a specific amount of bandwidth for the set of packets based on determining that the cache does not include the first entry.

6. A method as recited in claim 1, further comprising creating and storing information that specifies accesses using HTTP protocol to World Wide Web pages at particular sites based on the set of packets.

7. A method as recited in claim 1, further comprising giving priority to the set of packets, based on the cache including the second entry and that the set of packets uses fewer network resources as compared to a threshold value that specifies an amount of network resources used.

8. A method as recited in claim 1, further comprising:
   examining a third entry in the cache corresponding to an additional set of packets;

comparing a current time with a last time of the third entry corresponding to when a last packet of the additional set of packets was routed; and when the current time and the last time differ by at least a selected timeout, deleting the third entry from the cache.

9. A method as recited in claim 1, further comprising:

examining a third entry in the cache corresponding to an additional set of packets;

comparing a current time with a first time of the third entry corresponding to when a first packet of the additional set of packets was routed; and when the current time and the first time differ by at least a selected timeout, deleting the third entry from the cache.

10. A method as recited in claim 1, further comprising:

examining a third entry in the cache corresponding to an additional set of packets;

determining that "next hop" information in the third entry has changed; and deleting the third entry from the cache.

11. A method as recited in claim 1, further comprising:

examining a third entry in the cache corresponding to an additional set of packets;

determining that access control list information in the third entry has changed such that a source endpoint associated with the set of packets no longer has access to a destination endpoint associated with the set of packets; and deleting the third entry from the cache.

12. A method as recited in claim 1, further comprising:

determining that a size of the cache has reached a certain size; and deleting a third entry in the cache corresponding to an additional set of packets when the additional set of packets is least-recently-used as determined based upon the third entry.

13. A method as recited in claim 1, wherein the cache includes a set of buckets; each bucket in the set of buckets includes a linked list of one or more entries; and each entry of the one or more entries includes information about a particular set of packets.

14. A method as recited in claim 1, wherein the second entry includes information that specifies an output port number for routing packets in the set of packets.

15. A method as recited in claim 1, wherein the second entry includes information that specifies whether access is permitted for packets in the set of packets.

16. A method as recited in claim 1, wherein the second entry includes information that specifies a cumulative count for a number of packets in the set of packets.

17. A method as recited in claim 1, wherein the second entry includes information that specifies a cumulative count for a number of bytes in the set of packets.

18. A method as recited in claim 1, further comprising:

collecting historical information about the set of packets; and recording the historical information in a table.

19. A method as recited in claim 18, further comprising:

determining a size of the table;

comparing the size of the table with a selected size value; and when the size of the table exceeds the selected size value, reporting the historical information about the set of packets.

20. A method as recited in claim 18, further comprising:

generating an information packet, based on the historical information about two or more sets of packets in the table; and transmitting the information packet to a selected destination device that updates a database in a format for the RMON protocol, based on the information packet.

21. A method as recited in claim 18, further comprising:

generating an information packet, based on the historical information about all sets of packets in the table; and transmitting the information packet to a selected destination device that updates a database in a format for the RMON protocol, based on the information packet;

wherein the selected destination device is queried by a reporting device that generates a report about a condition of a network.

22. A method as recited in claim 1, wherein a plurality of protocol types are used, and further comprising determining how many sets of packets use each protocol type of the plurality of protocol types.

23. A computer-implemented method, comprising:

receiving a first packet in a stream;

based on the first packet, identifying a source address, a destination address, a source port, a destination port, and a protocol type;

determining that a cache does not include a first entry that corresponds to the stream, based on the source address, the destination address, the source port, the destination port, and the protocol type;

adding to the cache a second entry that corresponds to the stream;

based on the source address, the destination address, the source port, the destination port, and the protocol type, obtaining routing information for the first packet;

based on the routing information, routing the first packet;

receiving a second packet in the stream;

based on the second packet, identifying the source address, the destination address, the source port, the destination port, and the protocol type;

determining that the cache includes the second entry that corresponds to the stream, based on the source address, the destination address, the source port, the destination port, and the protocol type;

retrieving the routing information for the second packet from the second entry in the cache; and based on the routing information, routing the second packet.

24. A method as recited in claim 23, further comprising:

determining a flow key for the set of packets based on the source address, the destination address, the source port, the destination port, and the protocol type;

wherein adding to the cache the second entry further comprises including the flow key in the second entry, wherein the stream is a flow, and wherein the cache is a flow cache.

* * * * *

UNITED STATES PATENT AND TRADEMARK OFFICE
CERTIFICATE OF CORRECTION

PATENT NO. : 7,260,518 B2  Page 1 of 1
APPLICATION NO. : 10/924710
DATED : August 21, 2007
INVENTOR(S) : Kerr et al.

It is certified that error appears in the above-identified patent and that said Letters Patent is hereby corrected as shown below:

On the title page item
(54) delete "NETWORK FLOW SWITCHING AND FLOW DATA REPORT"
And insert --NETWORK FLOW SWITCHING AND FLOW DATA EXPORT--

COLUMN 1
Line 2, delete "DATA REPORT" and insert --DATA EXPORT--

Signed and Sealed this

Fourteenth Day of April, 2009

JOHN DOLL
*Acting Director of the United States Patent and Trademark Office*